US006840278B2

(12) United States Patent
Chen

(10) Patent No.: US 6,840,278 B2
(45) Date of Patent: Jan. 11, 2005

(54) CERAMIC PLATE FOR STICK OPERATED CORE SHAFT

(75) Inventor: Mei-Li Chen, Taichung Hsien (TW)

(73) Assignee: Kuching International Co., Ltd., Taichung Hsien (TW)

( * ) Notice: Subject to any disclaimer, the term of this patent is extended or adjusted under 35 U.S.C. 154(b) by 99 days.

(21) Appl. No.: 10/395,077

(22) Filed: Mar. 25, 2003

(65) Prior Publication Data

US 2004/0187936 A1 Sep. 30, 2004

(51) Int. Cl.[7] .............................................. F16K 11/078
(52) U.S. Cl. ................................................. 137/625.17
(58) Field of Search ......................... 137/625.17, 625.4

(56) References Cited

U.S. PATENT DOCUMENTS

| | | | | |
|---|---|---|---|---|
| 5,100,565 A | * | 3/1992 | Fujiwara et al. | 251/368 |
| 5,893,386 A | * | 4/1999 | Caria et al. | 137/271 |
| 6,321,789 B1 | * | 11/2001 | Chen | 137/625.17 |
| 6,766,827 B2 | * | 7/2004 | Chen | 137/625.4 |

* cited by examiner

Primary Examiner—John Fox
(74) Attorney, Agent, or Firm—Troxell Law Office PLLC

(57) ABSTRACT

A ceramic plate for stick operated core shaft of a faucet is mainly made up of a faucet body, a locking unit, a valve case, a mount seat, a control stick, a stick fixing mount, a fixing unit, an upper switch valve, a lower switch valve and a faucet handle wherein the control stick activated by the faucet handle is engaged with the upper switch valve via an actuating block of the control stick inserted to a linkage groove disposed at the top of the upper switch valve for regulating the discharge of cold/hot water. When the faucet handle is switched to the right, the control stick will move the upper switch valve to slide to the left till a curved switch groove of the upper switch valve covers on top of a cold water inlet hole of the lower switch valve for the discharge of cold water out of a water outlet hole of the lower switch valve. Meanwhile, hot water is discharged in the other way around when the faucet handle is switched to the left for the upper switch valve to slide to the right till the curved switch groove thereof covers on top of a hot water inlet hole and the water outlet hole thereof for hot water discharge in the habitual manner, preventing users from carelessly burning themselves by hot water.

3 Claims, 5 Drawing Sheets

CERAMIC PLATE FOR STICK OPERATED CORE SHAFT

BACKGROUND OF THE INVENTION

The present invention is related to a ceramic plate for stick operated core shaft of a faucet, comprising a faucet body, a locking unit, a valve case, a mount seat, a control stick, a stick fixing mount, a fixing unit, an upper switch valve, a lower switch valve, and a faucet handle wherein said control stick activated by said faucet handle is engaged with said upper switch valve via an actuating block of said control stick inserted to a linkage groove disposed at the top of said upper switch valve thereof for the discharge of cold/hot water. When said faucet handle is switched to the right, said control stick will slide said upper switch valve to the left till a curved switch groove of said upper switch groove covers on top of a cold water inlet hole of a lower switch valve for the discharge of cold water out of a water outlet hole of said lower switch valve. Meanwhile, hot water is discharged in the other way around when said faucet handle is switched to the left in the habitual manner, preventing users from carelessly burning themselves by hot water.

Please refer to FIG. 1. A conventional faucet for hot and cold water is mainly made up of a faucet body 10, a locking ring 13, a valve case 20, a valve 21, a control stick 22, a fixing unit 23, an upper switch valve 24, a lower switch valve 25 and a faucet handle 30. The faucet body 10 is provided with a receiving cavity 11 with an internally threaded locking upper section 12 disposed at the rear center thereof to be communicated with internal water inlet and outlet passages thereof. The locking ring 13 has a locking hole 131 disposed at the center thereof and externally threaded locking section 132 disposed at the lower outer periphery thereof. The valve case 20, stepwise, is provided with a valve chamber 201 disposed at the inner side thereof and two limiting blocks 202 disposed at the top of said valve chamber 201 thereof. The valve 21 is equipped with a through hole 211 disposed at the center thereof, two opposite vertical grooves 215 disposed at the inner periphery thereof, an arc upper abutment facet 212 disposed at the upper section of the through hole 211 thereof, an upper tapered recess 213 extending at top of the arc upper abutment facet 212 thereof, and a positioning block 214 extending from the bottom at the outer periphery thereof.

The control stick 22 has a small actuating ball 221 disposed at the bottom thereof, and a large rotary ball 223 disposed at the lower section thereof with a link section 222 joining the small actuating ball 221 and the large rotary ball 223 thereof. A post 224 is led through and extends at both ends at the middle of the large rotary ball 223 thereof, and a main shaft body 225 is extending at top of the large rotary ball 223 with an externally threaded upper section 226 disposed at the end thereof. The fixing unit 23, whose outer circumference is equal to the inner circumference of the through hole 211 of the valve 21, is provided with an arc lower abutment facet 231 defining the central hollow thereof, and a lower tapered recess 232 extending at the bottom of the arc lower abutment facet 231 thereof. The upper switch valve 24 has a linkage groove 243 defined at the top thereof, and a switching groove 242 disposed at the bottom thereof. The lower switch valve 25, having two water inlet holes 251, 252, and one water outlet hole 253 disposed thereon, is mounted onto a base 254 having a through hole 255 disposed thereon. The upper switch valve 24 can be horizontally moved and rotated on the lower switch valve 25 for regulating the discharge of hot or cold water thereof. The faucet handle 30, vertical-typed, has a round-headed bottom with internally threaded section 31 disposed at the center thereof.

Please refer to FIG. 2. In assembly, said control stick 22 is led through the through hole 211 and joined to said valve 21 from the bottom thereof with the main shaft body 225 extending out at the top thereof. The upper edge of the large rotary ball 223 is abutted against the upper abutment facet 212 thereof, and both ends of said post 224 thereof is adapted to said opposite vertical grooves 215 thereof. The fixing unit 23 is then adapted to the through hole 211 of the valve from the bottom thereof with the link section 222 thereof received at the inner side of the lower tapered recess 232 thereof and the small actuating ball 221 extending out of the fixing unit 23 at the bottom thereof. The lower edge of the large rotary ball 223 is abutted against the lower abutment facet 231 thereof. The valve 21 is then mounted onto the upper switch valve 24 with the small actuating ball 221 inserted into the linkage groove 243 thereof. The valve case 20 is applied to encase said valve 21 and the upper and lower switch valves 24, 25 therein with the positioning block 214 of the valve 21 located at the space defined by the two limiting blocks 202 of the valve case thereof for limiting the location and preventing the rotation of the valve 21 thereof. The upper section of the main shaft body 225 thereof is extended out at the top of the valve case 20, and the lower section of the valve case 20 is engaged with the lower outer periphery of the base 254 of the lower switch valve 25 thereof to complete the assembly of a switch valve unit which is then adapted to the receiving cavity 11 of the faucet body 40 thereof and screw joined thereto via the locking ring 13. The upper section of the valve 21 is fixedly located at the locking hole 131 of the locking ring 13 thereof and the main shaft body 225 extending out at the top of said valve 21 is screw joined to the internally threaded section 31 of the faucet handle 30 via the externally threaded upper section 226 thereof to complete the assembly thereof.

Please refer to FIG. 3. For the discharge of cold water, the faucet handle 30 is switched to the left and the small actuating ball 221 of the control stick 22 will activate the upper switch valve 241 to slide to the right therewith. Cold water will flow through the through hole 255 of the base 254 to come out at the water inlet hole 252 of the lower switch valve 25. The switch groove 242 of the upper switch valve 24 then channels the water to go out at the water outlet hole 253 of said lower switch valve 25 for the discharge of cold water out of said faucet body 10 for use.

Please refer to FIG. 4. For the discharge of hot water, the faucet handle 30 is switched to the right and the upper switch valve 241 activated by the small actuating ball 221 thereof will slide to the left therewith. Hot water coming out at the water inlet hole 251 of the lower switch valve 25 will be channeled by the switch groove 242 of the upper switch valve 24 to go out at the water outlet hole 253 thereof for discharging out of the faucet body 10 for use.

There are some drawbacks to such conventional faucet for cold and hot water. Most of all, the faucet handle 30 is switched to the left for the discharge of cold water, and the right for hot water, which is contrary to the habitual manner of cold/hot water discharge of a normal faucet. Thus, people can easily get hurt by hot water when carelessly switching the faucet handle 30 to the right for cold water in the usual way.

SUMMARY OF THE PRESENT INVENTION

It is, therefore, the primary purpose of the present invention to provide a ceramic plate for stick operated core shaft of a faucet wherein a faucet handle is adapted to activate a control stick which is engaged with an upper switch valve via an actuating block of said control stick inserted to a linkage groove disposed at the top of the upper switch valve thereof for the discharge of cold/hot water. When the faucet handle is switched to the right, the control stick will slide the upper switch valve to the left till a curved switch groove of the upper switch valve covers on top of a cold water inlet hole of a lower switch valve for the discharge of cold water out of a water outlet hole of the lower switch valve. Meanwhile, hot water is discharged in the other way around when the faucet handle is switched to the left in the habitual manner, preventing users from carelessly burning themselves by hot water.

DETAILED DESCRIPTION OF THE PREFERRED EMBODIMENTS

Figure 5:
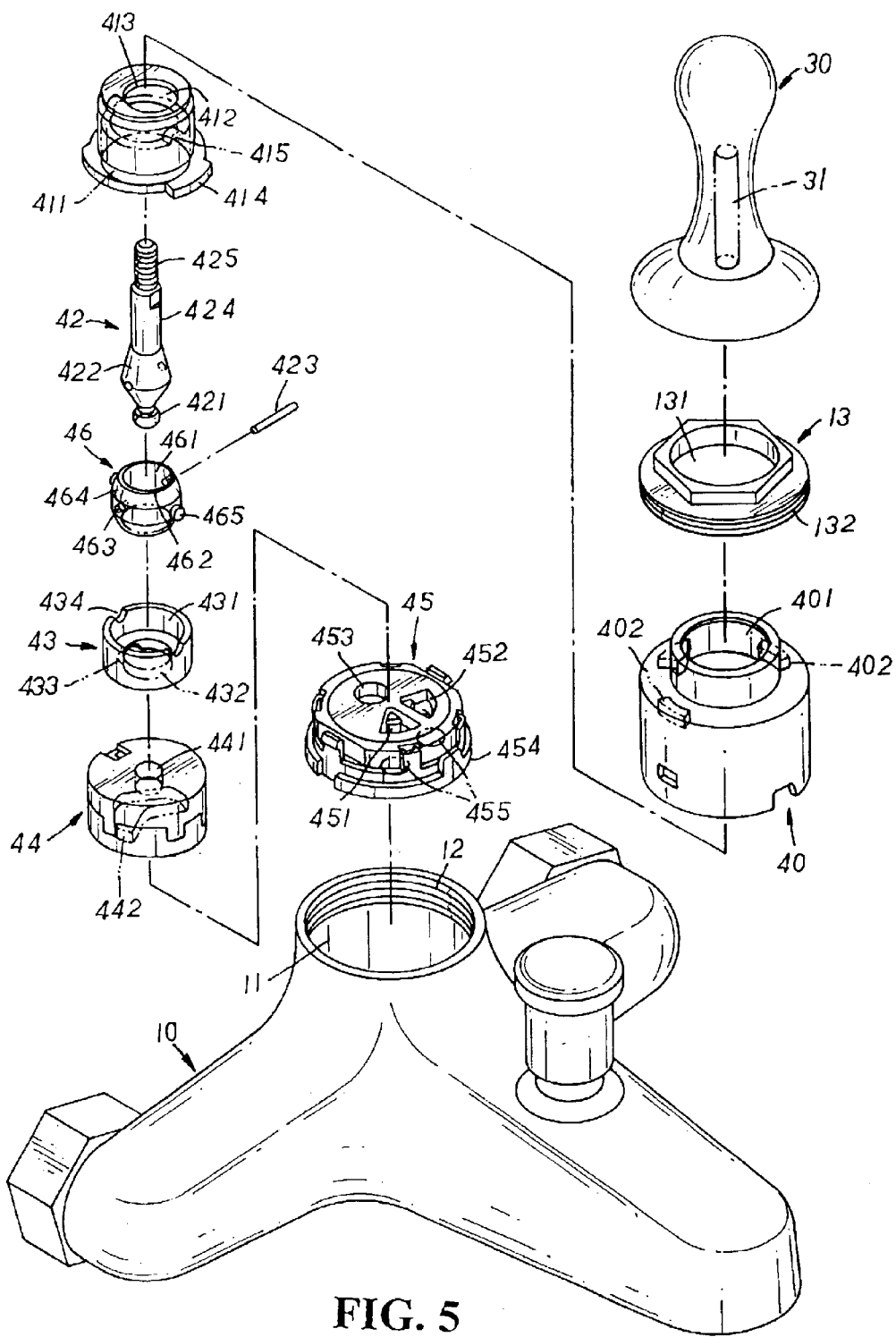
FIG. 5 is perspective exploded view of the present invention.

Please refer to FIG. 5. The present invention is related to a ceramic plate for stick operated core shaft of a faucet, comprising a faucet body 10, a locking unit 13, a valve case 40, a mount seat 41, a control stick 42, a stick fixing mount 46, a fixing unit 43, an upper switch valve 44, a lower switch valve 45, and a faucet handle 30.

The faucet body 10 has a receiving cavity 11 with an internally threaded locking upper section 12 disposed at the rear center thereof to be communicated with internal water inlet and outlet passages thereof. The locking unit 13 has a locking hole 131 disposed at the center thereof and externally threaded locking section 132 disposed at the lower outer periphery thereof. The faucet handle 30, vertical in type (which can also be round-headed, or duckbill-shaped, etc.), has an internally threaded section 31 disposed at the inside thereof. The valve case 40, stepwise, is provided with a valve chamber 401 disposed at the inner side thereof and two limiting blocks 402 disposed at the top of the valve chamber 401 thereof. The mount seat 41 is equipped with a large and a small stepwise cavities 411, 412 disposed at the inner side thereof with a pair of opposite semi-circular abutting grooves 415 disposed at the bottom edge of the small stepwise cavity 412 thereof, an eccentric through hole 413 disposed at the top side thereof, and a positioning block 414 extending outwards from the bottom at the outer periphery thereof. The control stick 42 is made up of an arc actuating block 421 having a flat facet disposed at the bottom thereof, a bulged lower section 422 extending at the top of the arc actuating block 421 thereof with a post 423 projecting at both ends out of the middle bulged section thereof, a main shaft body 424 extending for a proper length at top of the bulged lower section 422 thereof, and an externally threaded upper section 425 disposed at the top thereof.

The stick fixing mount 46 is provided with a through hole 461 disposed at the center thereof with a slant abutment facet 462 disposed at the upper front section thereof and a pair of corresponding slots 463 disposed at the inner periphery thereof. The stick fixing mount 46 also includes a symmetric tapered facet 464 with a bulged middle section defining the outer periphery thereof and two symmetric positioning blocks 465 projecting at the bulged middle section thereof. The fixing unit 43 has a receiving groove 431 disposed at the top thereof, a stop ring 432 disposed at the lower end thereof, an arc recess 433 defining one edge of the stop ring 432 thereof and a pair of symmetric semi-circular cuts 434 defining the upper edge of the receiving groove 431 thereof. The upper switch valve 44 is provided with a linkage groove 441 disposed at the top thereof, and a curved switching groove 442 with a certain width disposed at the bottom thereof. The lower switch valve 45, equipped with a hot water inlet holes 451, a cold water inlet hole 452 and a water outlet hole 453, is mounted onto a base 454 having cold/hot water through holes 455 disposed thereon. The upper switch valve 44 can be horizontally moved and rotated on the lower switch valve 45 to adjust the curved switching groove 442 thereof matching to either hot/cold water inlet holes 451, 452 for either cold or hot water to come out via the water outlet hole 453 thereof, effecting the switching of cold/hot water discharge for use.

Figure 1:
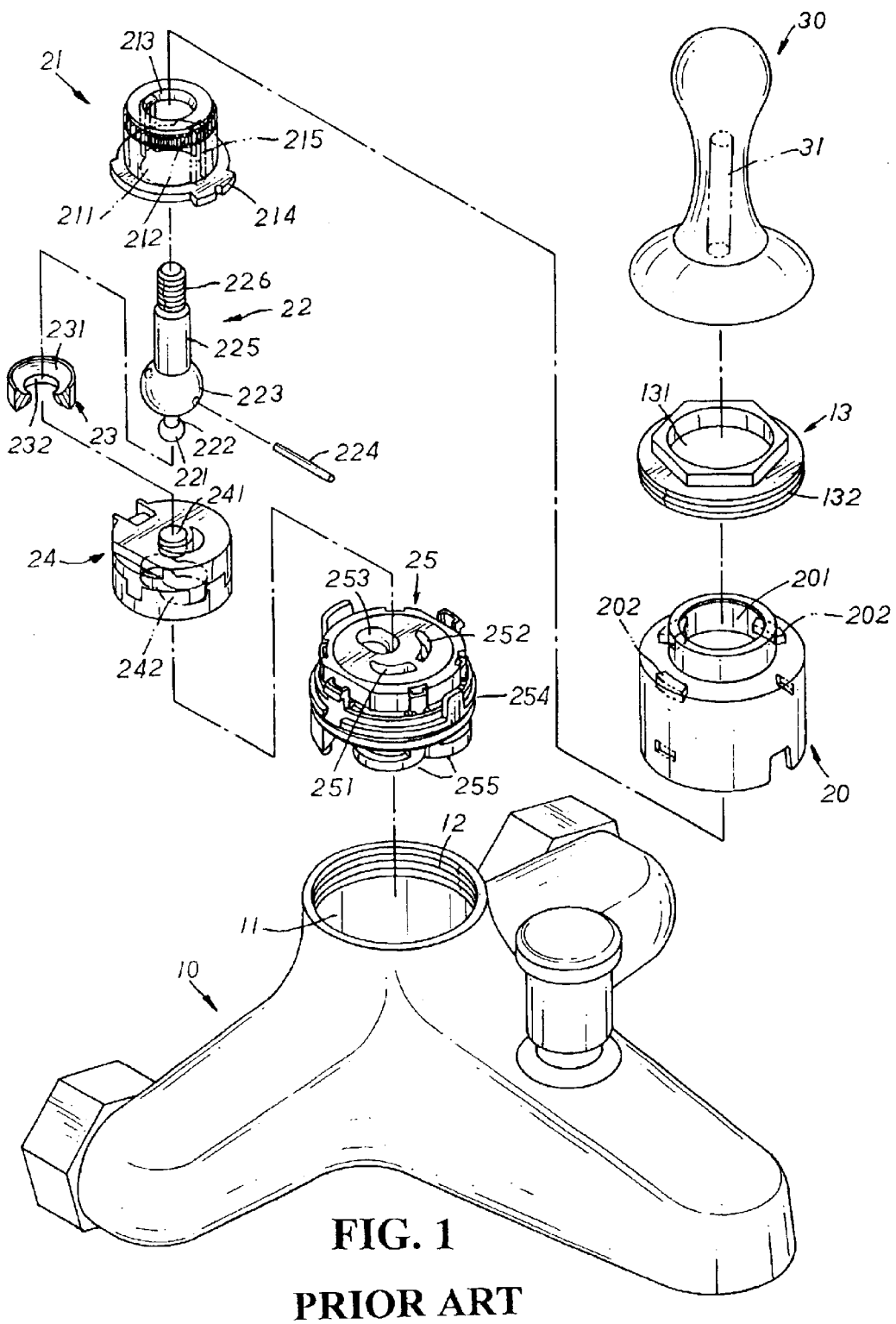
FIG. 1 is a perspective exploded view of a conventional faucet.
Figure 4:
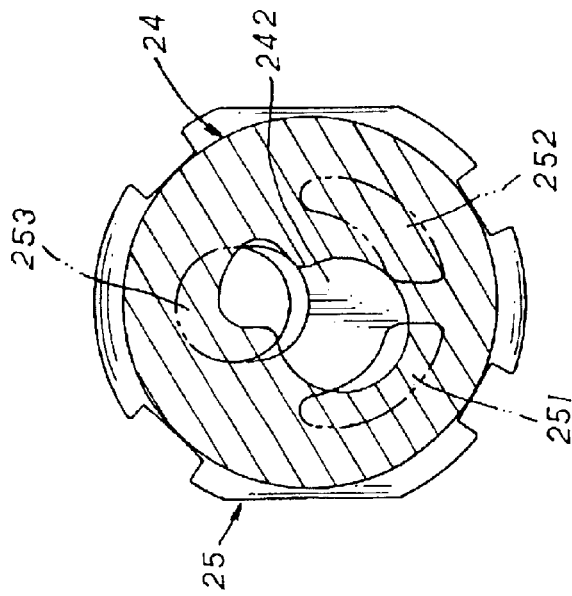
FIG. 4 is a diagram showing the discharge of hot water of a conventional faucet in operation.
Figure 2:
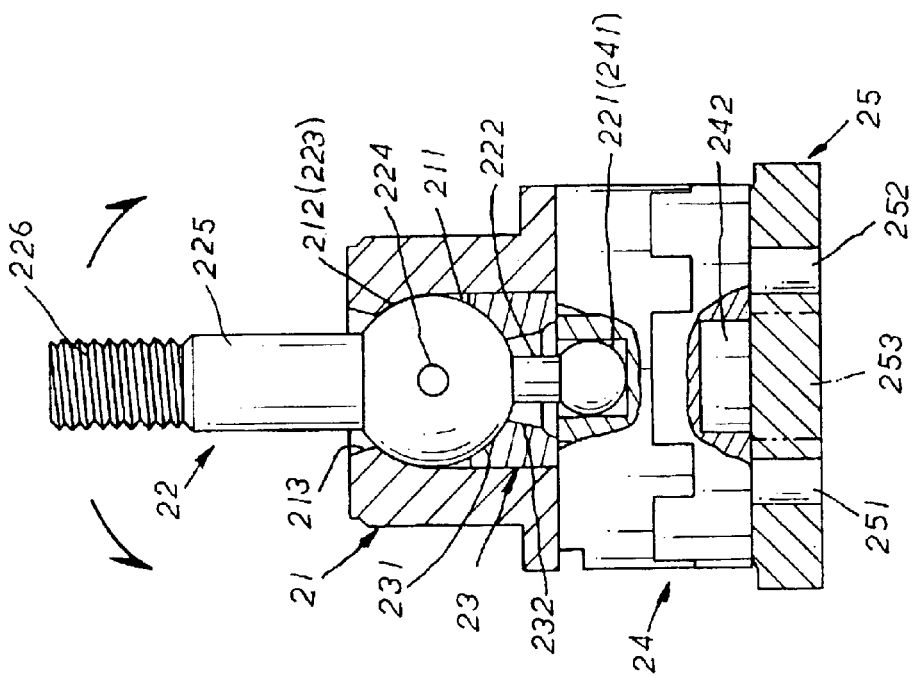
FIG. 2 is a partially sectional view of a conventional faucet in assembly.
Figure 6:
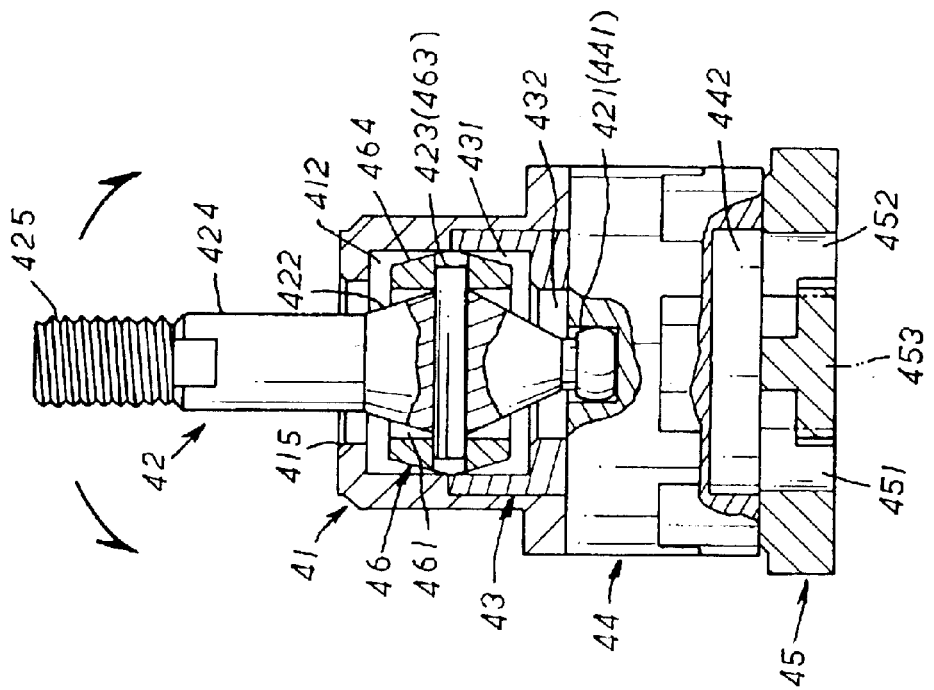
FIG. 6 is a partially sectional view of the present invention in assembly.
Figure 3:
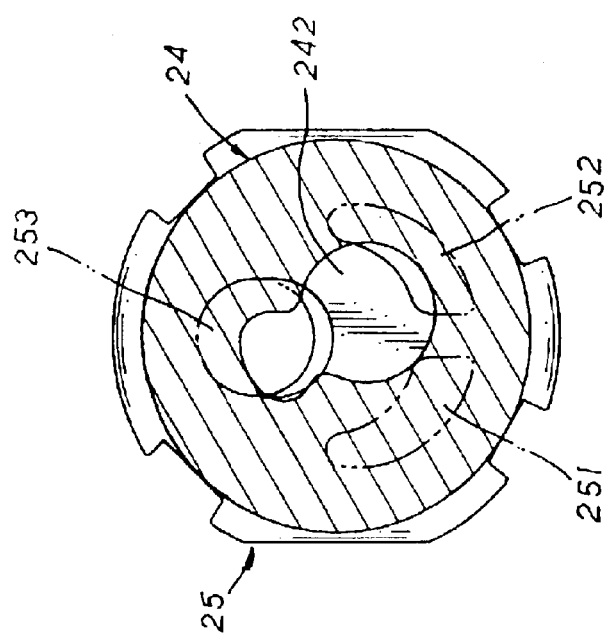
FIG. 3 is a diagram showing the discharge of cold water of a conventional faucet in operation.

Please refer to FIG. 6. In assembly, said control stick 42 is led through the stick fixing mount 46 from the top thereof with both ends of said post 423 projecting at the bulged lower section 422 thereof inserted into the corresponding slots 463 of said stick fixing mount 46 thereof. The control stick 42 joined to the stick fixing mount 46 is adapted to the large stepwise cavity 411 of the mount seat 41 from the bottom thereof with the main shaft body 424 extending upwards for a proper length at the top of the mount seat 41 thereof, and the upper edges of the symmetric positioning blocks 465 of the stick fixing mount 46 abutted against the opposite semi-circular abutting grooves 415 of the small stepwise cavity 412 thereof. After the upper part of the control stick 42 and stick fixing mount 46 being received at the small stepwise cavity 412 thereof, the fixing unit 43 is led and joined to the large stepwise cavity 411 from the bottom thereof with the symmetric semicircular cuts 434 clamped to the lower edges of the symmetric positioning blocks 465 thereof for location. The mount seat 41 thereof is then located onto the upper switch valve 44 with the arc actuating block 421 of the control stick 42 thereof inserted into the linkage groove 441 thereof. The valve case 40 is applied to encase said mount seat 41 and the upper and lower switch valve 44, 45 therein with the positioning block 414 of the mount seat 41 located at the space defined by the two limiting blocks 402 of the valve case 40 thereof for both limiting the location and preventing the rotation of the mount seat 41 thereof. The upper section of the main shaft body 424 thereof is extended upwards at the top of the valve case 40, and the lower section of the valve case 40 is engaged with the lower outer periphery of the base 454 of the lower switch valve 45 to complete a switch valve unit, which is then adapted to the receiving cavity 11 of the faucet body 10 thereof and screw joined thereto via the locking unit 13 sleeve joined to the upper section of the valve case 40 thereof. The upper section of the mount seat 41 is fixedly located at the locking hole 131 of the locking unit 13 thereof and the main shaft body 424 extending out of the mount seat 41 thereof is screw joined to the internally threaded section 31 of the faucet handle 30 via said externally threaded upper section 425 thereof to complete the assembly of the present invention.

Figure 7:
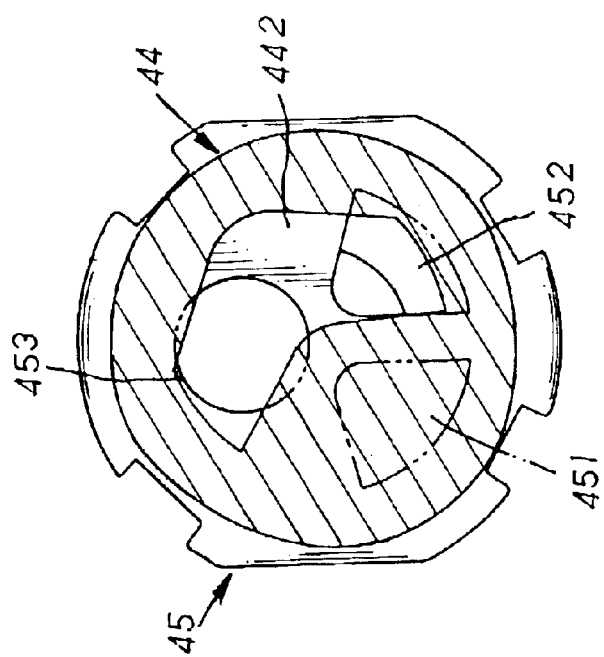
FIG. 7 is a diagram showing the discharge of cold water of the present invention in operation.

Please refer to FIG. 7. For the discharge of cold water, the faucet handle 30 is switched to the right to activate the control stick 42 which will then move the upper switch valve 44 sliding to the left for a certain angle via the actuating block 421 thereof. The upper switch valve 44 will keep sliding to the left till the curved switch groove 442 thereof covers on top of both the cold water inlet hole 452 and water outlet hole 453 of the lower switch valve 45 for the discharge of cold water thereby. Cold water coming through the cold water through hole 455 of the base 45 and the cold water inlet hole 452 of the lower switch valve 45 will be channeled by the curved switch groove 442 thereof to go out at the water outlet hole 453 thereof and discharge out of the faucet body 10 for use.

Figure 8:
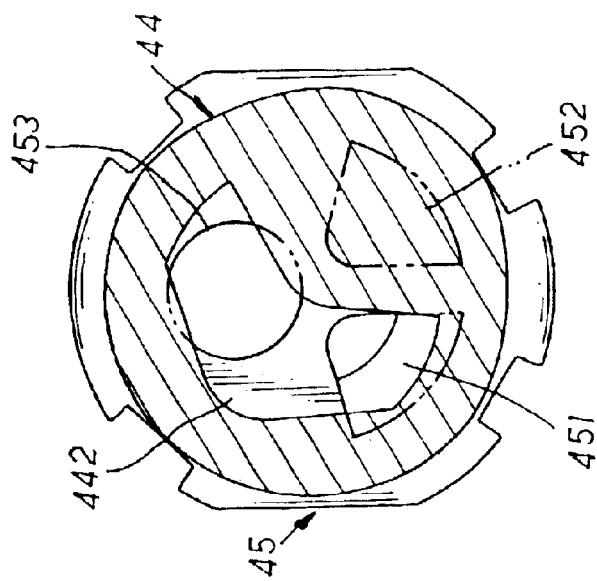
FIG. 8 is a diagram showing the discharge of hot water of the present invention in operation.

Please refer to FIG. 8. For the discharge of hot water, the faucet handle 30 is switched to the left to activate the control stick 42 which will then move the upper switch valve 44 to slide to the right for a certain angle via the actuating block 421 thereof. The upper switch valve 44 will keep sliding to the right till the curved switch groove 442 thereof covers on top of both the hot water inlet hole 451 and water outlet hole 453 of the lower switch valve 45 for the discharge of hot water thereby. Hot water coming through the hot water through hole 455 of the base 45 and the hot water inlet hole 451 of the lower switch valve 45 will be channeled by the curved switch groove 442 thereof to go out at the water outlet hole 453 thereof and discharge out of the faucet body 10 for use. Thus, without contradicting to the habitual manner of using a cold/hot water faucet, the present invention can safely prevent users from carelessly burning themselves by hot water.

What is claimed is:

1. A ceramic plate for stick operated cure shaft of a faucet, comprising a faucet body, a locking unit, a valve case, a mount seat, a control stick, a stick fixing mount, a fixing unit, an upper switch valve, a lower switch valve, and a faucet handle wherein said faucet body has a receiving cavity with an internally threaded locking upper section disposed at the rear center thereof to be communicated with internal water inlet and outlet passages thereof, and said locking unit has a locking hole disposed at the center thereof and externally threaded locking section disposed at the lower outer periphery thereof; said present invention characterized by that, said valve case, stepwise, having a valve chamber disposed at the inner side thereof and two limiting blocks disposed at the top of said valve chamber thereof;

said mount seat having a large and a small stepwise cavities disposed at the inner side thereof with a pair of opposite semi-circular abutting grooves disposed at the bottom edge of said small stepwise cavity thereof, an eccentric through hole disposed at the top side thereof, and a positioning block extending outwards at the bottom of the outer periphery thereof;

said control stick being made up of an arc actuating block having a flat facet disposed at the bottom thereof, a bulged lower section extending at the top of said arc actuating block thereof with a post projecting at both ends out of the middle bulged section thereof, a main shaft body extending for a proper length at top of said bulged lower section thereof, and an externally threaded upper section disposed at the top thereof;

said stick fixing mount having a through hole disposed at the center thereof, a symmetric tapered facet with a bulged middle section defining the outer periphery thereof, a slant abutment facet disposed at the upper inner periphery of said through hole thereof, and a pair of corresponding slots and two symmetric positioning blocks disposed respectively at the bulged middle section of said symmetric tapered facet thereof;

said fixing unit having a receiving groove disposed at the top thereof, a stop ring disposed at the lower end thereof, an arc recess defining one edge of said stop ring thereof and a pair of symmetric semicircular cuts defining the upper edge of said receiving groove thereof;

said upper switch valve having a linkage groove disposed at the top thereof, and a curved switching groove with a certain width disposed at the bottom thereof;

said lower switch valve having a hot water inlet holes, a cold water inlet hole and a water outlet hole disposed thereon, and being mounted onto a base having cold/hot water through holes disposed thereon;

in assembly, said control stick joined to said stick fixing mount is adapted to the large stepwise cavity of said mount seat thereof with the upper part of the control stick and stick fixing mount received at said small stepwise cavity thereof, and said fixing unit is led and joined to said large stepwise cavity from the bottom thereof; said mount seat thereof is then located onto the upper switch valve with the arc actuating block of said control stick inserted into the linkage groove of said upper switch valve; said valve case is adapted to encase said mount seat and said upper and lower switch valves therein to complete a switch valve unit which is then adapted to the receiving cavity of said faucet body thereof and screw joined thereto via said locking unit thereof; said main shaft body thereof extending out of said mount seat is screw joined to said faucet handle via said externally threaded upper section thereof to complete the assembly thereof;

whereby, for the discharge of cold water, said faucet handle is switched to the right to activate said control stick which will slide said upper switch valve to the left for a certain angle via said actuating block thereof; said upper switch valve will keep sliding to the left till said curved switch groove thereof covers on top of both the cold water inlet hole and water outlet hole of the lower switch valve for cold water coming out through the cold water through hole of said base and the cold water inlet hole of said lower switch valve to go out at said water outlet hole thereof and discharge out of said faucet body for use; for the discharge of hot water, said faucet handle is switched to the left to activate said control stick which will slide said upper switch valve to the right for a certain angle via said actuating block thereof till said curved switch groove covers on top of both the hot water inlet hole and water outlet hole of the lower switch valve for hot water coming through the hot water through hole of said base and the hot water inlet hole of said lower switch valve to go out at said water outlet hole thereof and discharge out of said faucet body for use, which, without contradicting to the habitual manner of using a cold/hot water faucet, can safely prevent users from carelessly burning themselves by hot water.

2. The ceramic plate for stick operated core shaft of a faucet as claimed in claim 1 wherein the switch groove disposed at the bottom of said upper switch valve is curved in shape and has a certain width to adjust the discharge of cold/hot water for use.

3. The ceramic plate for stick operated core shaft of a faucet as claimed in claim 1 wherein the faucet handle thereof can be formed in other styles such as round-headed or duckbill-shaped, etc.

* * * * *